United States Patent [19]

Noble

[11] 4,029,402
[45] June 14, 1977

[54] OPTICAL AID FOR USE IN THE SELECTION OF SPECTACLE FRAMES

[76] Inventor: Adrian Clive Noble, 16 Dovedale Avenue, Kenton, Harrow, Middlesex HA3 ODX, England

[22] Filed: Nov. 28, 1975

[21] Appl. No.: 636,050

[30] Foreign Application Priority Data

Dec. 20, 1974 United Kingdom ............ 55204/74

[52] U.S. Cl. .................................. 351/22; 351/19; 351/28; 351/58; 351/178
[51] Int. Cl.² .......................................... A61B 3/04
[58] Field of Search ................. 351/22, 19, 21, 28, 351/29, 58, 60, 178, 20

[56] References Cited

UNITED STATES PATENTS

| | | | |
|---|---|---|---|
| 1,717,224 | 6/1929 | King | 351/22 |
| 1,884,371 | 10/1932 | Swart | 351/22 |
| 2,872,843 | 2/1959 | Kono | 351/22 |

OTHER PUBLICATIONS

"Lens Insert" The Optical Journal & Review of Optometry, vol. No. XC, Issue No. 19, p. 19, 10/1/1953.

*Primary Examiner*—Saxfield Chatmon, Jr.
*Attorney, Agent, or Firm*—Woodhams, Blanchard and Flynn

[57] ABSTRACT

An optical aid for use in the selection of spectacle frames is in the form of a trial lens mount having a lens holder with a plurality of resilient arms extending outwardly therefrom which carry at their extremities members which engage a lens-retaining groove of a spectacle frame. Each of a set of such optical aids has a lens of different power, and the appropriate aid can be fitted in a desired frame to enable the subject to view the frame himself. The arms are of different lengths and enable the mount to be used in frames of a multitude of different sizes.

7 Claims, 3 Drawing Figures

OPTICAL AID FOR USE IN THE SELECTION OF SPECTACLE FRAMES

This invention relates to an optical aid for use in the selection of spectacle frames.

Normally a patient who ia choosing a spectacle frame is unable by using a mirror to see himself clearly when wearing the frame because it does not carry a lens and provides no correction of his eyesight. Thus he finds it difficult to select a spectacle frame of appearance pleasing when worn. Trial lenses to provide approximate correction of a patient's eyesight would enable the patient clearly to see himself and the frame he is wearing by looking into a mirror, and he could thus more easily chose a frame the appearance of which he likes when worn by himself.

According to the present invention, there is provided an optical aid for use in the selection of spectacle frames comprising a holder for a lens and a plurality of outwardly extending resilient arms carrying at their extremities members dimensioned and arranged to engage a lens-retaining groove of a spectacle frame. The arms are preferably of different lengths so the mount may be fitted to spectacle frames whose lens openings are not circular. Preferably also the mount may be moulded in one piece from plastics material.

An embodiment of the invention will now be described in more detail, by way of example, with reference to the accompanying drawings in which.

Figure 1:
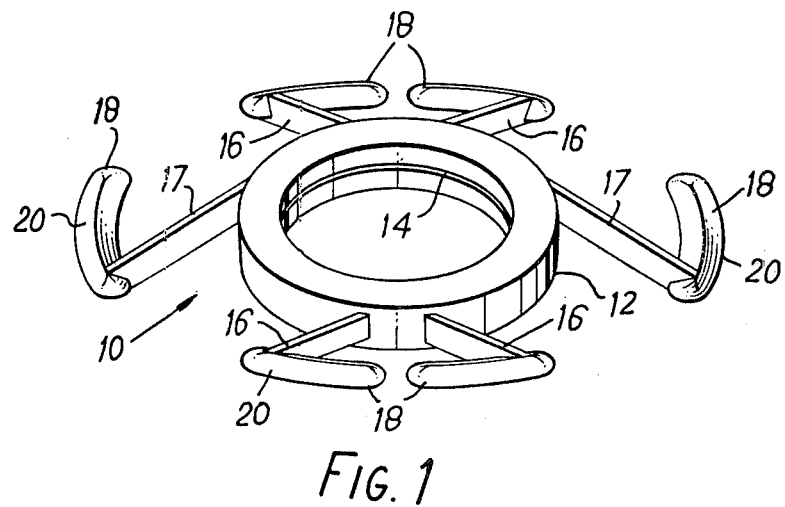
FIG. 1 is a perspective view of a trial lens mount embodying the invention.

A trial lens mount 10 for use in the selection of spectacle frames comprises an annular lens holder 12 having a circular internal groove 14 for receiving a trial lens 15. The mount has resilient arms 16 and 17 outwardly extending from the holder which arms at their extremities carry arcuate members 18 having V-shaped outer edges 20, for engagement with a lens-retaining groove 22 in a lens opening of a spectacle frame 24. Two of the arms 17 are longer than the remaining arms 16 so that the mount fit frames whose lens openings are not circular. The whole mount 10 is moulded in one piece from polypropylene.

In use, a set of 12 mounts is provided, each mount holding a lens of different power. A mount with a lens appropriate to approximate correction of a patient's eyesight is selected, and the edges 20 of the arcuate members 18 are sprung into engagement with the lens-retaining groove 22 of a selected spectacle frame. The resilient arms flex, especially at their ends, and during fitting of the mount to a frame allow the arcuate members 18 to be pressed inwardly towards the holder 12 in a bellows-like motion. On being released, the members 18 spring outwardly again and seat in the groove 22. When the frame is worn by the patient he is able to see clearly and, by use of a mirror, can view the appearance of the selected frame.

Figure 2:
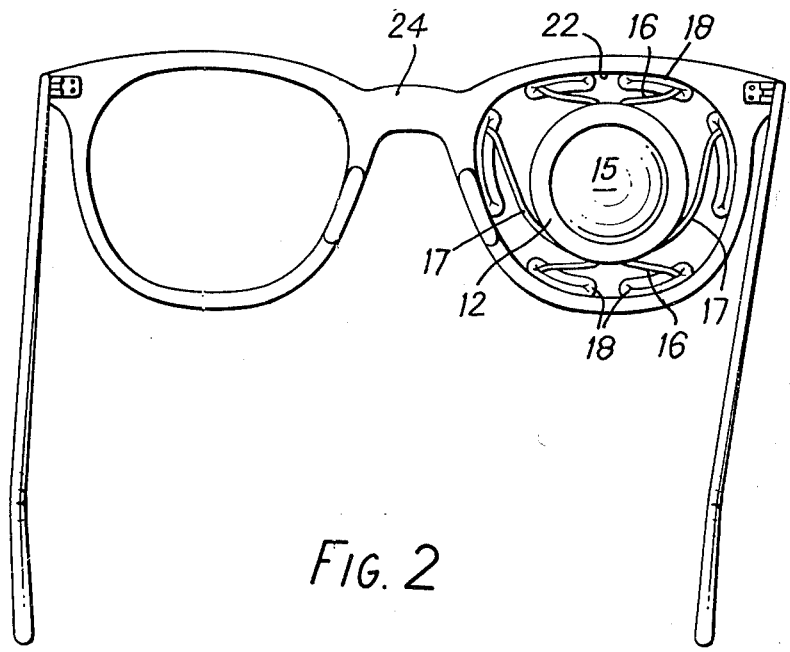
FIG. 2 is a perspective view of the mount containing a trial lens and fitted to a spectacle frame having rims for small lenses.
Figure 3:
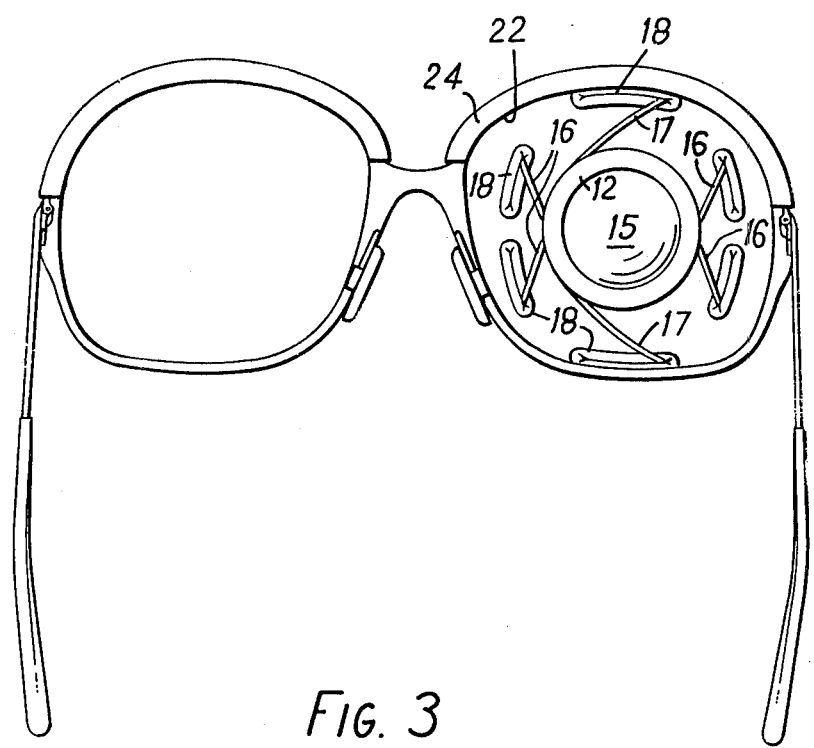
FIG. 3 is similar to FIG. 2 but shows the mount fitted to a spectacle frame having rims for large lenses.

In FIG. 2, the arms 16, 17 are shown held close to the holder 12 when the mount is fitted in a spectacle frame for small lenses. In FIG. 3, the mount is shown turned through a right angle, in which position by means of the members 18 at the extremities of the arms 17 the mount can fit securely in a spectacle frame designed for large lenses. The arms 16 and the members 18 at their extremities are not operative in this case. It will be appreciated that the mount may be used with spectacle frames of intermediate shapes and sizes with various members 18 seating in the groove 22, and the mount may be rotated so as to fit most securely.

Trial lenses 15 in mounts 10 may be fitted in both lenses openings of a spectacle frame for trial purposes, in which case pairs of trials lenses in mounts will be needed. If the patient's eyes need equal correction, such pairs of lenses in mounts must be of equal power, and therefore two like sets of trial lenses will be required. Alternatively, the patient may view himself wearing the frames by looking through one lens only in one side of the spectacle frame in which case the appearance of the spectacle frame on the other side will not be affected as no trial lens or mount is fitted therein.

In this specification, the term spectacle is to be understood to include like devices, such as lorgnette, pince-nez and monocle.

I claim:

1. An optical aid for use the selection of spectacle frames, comprising:
   a holder for a lens;
   at least two pairs of resilient arms extending outwardly from said holder, the arms of each pair being opposed to each other, and the arms of at least one of the pairs being longer than the arms of at least one other pair; and
   members at the extremities of the arms dimensioned and arranged to engage a lens-retaining groove of a spectacle frame, said members for at least each of the longer arms being arcuate in extent.

2. An optical aid according to claim 1, wherein there are six of said arms, four of which are substantially the same length, the lengths of the other two being greater and substantially equal to each other.

3. An optical aid according to claim 1, wherein the aid is moulded in one piece from plastics material.

4. An optical aid according to claim 1, wherein the members at the extremities of the arms have V-shaped outer edges.

5. An optical aid according to claim 1, wherein said arms comprise elongated springlike elements which project radially outwardly from and partially circumferentially around the holder, and wherein the opposed arms of each pair extend circumferentially with respect to the holder in opposite directions.

6. An optical aid according to claim 1, wherein there are at least three pairs of said resilient arms extending outwardly from said holder, the arms of a first of said pairs being longer than the arms of the second and third of said pairs, the arms of said second and third pairs being substantially the same length, each of said arms comprising an elongated springlike member projecting radially out and partially circumferentially around the holder, the arms of each pair extending circumferentially with respect to the holder in opposite directions, and said second and third pairs having arms thereof positioned closely adjacent one another and extending circumferentially in opposite directions with respect to said holder.

7. In a set of optical aids for use in the selection of spectacle frames, the improvement wherein each optical aid comprises a holder for a lens, and at least two pairs of resilient arms extending outwardly from said holder, the arms of each pair being opposed to each other, the arms of at least one of the pairs being longer than the arms of at least one other pair, and members at the extremities of the arms dimensioned and arranged to engage a lens-retaining groove of a spectacle frame, said members for at least each of the longer arms being arcuate in extent, and wherein the holders of the set of aids each carry lenses which are of different powers.

* * * * *